(12) United States Patent
Inomata et al.

(10) Patent No.: US 12,002,625 B2
(45) Date of Patent: Jun. 4, 2024

(54) CERAMIC ELECTRONIC DEVICE AND MANUFACTURING METHOD OF THE SAME

(71) Applicant: TAIYO YUDEN CO., LTD., Tokyo (JP)

(72) Inventors: Yasuyuki Inomata, Tokyo (JP); Kazumichi Hiroi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 18 days.

(21) Appl. No.: 17/883,375

(22) Filed: Aug. 8, 2022

(65) Prior Publication Data
US 2023/0081197 A1  Mar. 16, 2023

(30) Foreign Application Priority Data

Aug. 31, 2021 (JP) .................................. 2021-141842
Jul. 13, 2022 (JP) .................................. 2022-112256

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *C04B 35/64* (2013.01);
(Continued)

(58) Field of Classification Search
CPC ...... H01G 4/008; H01G 4/012; H01G 4/1209; H01G 4/1227; H01G 4/30; C04B 35/4682; C04B 35/64
See application file for complete search history.

(56) References Cited

U.S. PATENT DOCUMENTS

2003/0016484 A1   1/2003 Waida et al.
2012/0262840 A1*  10/2012 Koizumi ............... H01G 4/12
                                                          361/321.2

(Continued)

FOREIGN PATENT DOCUMENTS

JP   S56-94719 A      7/1981
JP   2002-289456 A   10/2002
(Continued)

OTHER PUBLICATIONS

Fu et al., "Anomalous Phase Diagram of Ferroelectric (Ba,Ca)TiO3 Single Crystals with Giant Electromechanical Response", Physical review letters, 100, 227601, 2008.

*Primary Examiner* — Nathan Milakovich
(74) *Attorney, Agent, or Firm* — CHEN YOSHIMURA LLP

(57) ABSTRACT

A ceramic electronic device includes a multilayer structure in which a plurality of dielectric layers and a plurality of internal electrode layers are alternately stacked. Each of the plurality of dielectric layers includes ceramic grains of a main component thereof expressed by $(Ba_{1-x-y}Ca_xSr_y)(Ti_{1-z}Zr_z)O_3$ ($0<x\leq0.2$, $0\leq y\leq0.1$, $0\leq z\leq0.1$). $D3<D1<D2$ is satisfied when an average grain diameter of the ceramic grains of the main component of the plurality of dielectric layers in a section in which each two internal electrode layers is D1, an average grain diameter of the ceramic grains of the main component of first dielectric layers which are located at different height positions from the internal electrode layers is D2, an average grain diameter of the ceramic grains of the main component of second dielectric layers which are located at same height positions of the internal electrode layers is D3.

7 Claims, 9 Drawing Sheets

(51) Int. Cl.
　　　*C04B 35/64* 　　　(2006.01)
　　　*H01G 4/008* 　　　(2006.01)
　　　*H01G 4/012* 　　　(2006.01)
　　　*H01G 4/30* 　　　(2006.01)
(52) U.S. Cl.
　　　CPC ............ *H01G 4/008* (2013.01); *H01G 4/012* (2013.01); *H01G 4/30* (2013.01)

(56) References Cited

U.S. PATENT DOCUMENTS

| | | | |
|---|---|---|---|
| 2014/0301013 A1* | 10/2014 | Kim | H01G 4/01 29/25.03 |
| 2016/0293333 A1 | 10/2016 | Kaneko et al. | |
| 2018/0090272 A1* | 3/2018 | Nagaoka | H01G 4/232 |
| 2018/0240592 A1* | 8/2018 | Morita | H01G 4/30 |
| 2019/0035554 A1 | 1/2019 | Inomata et al. | |
| 2022/0130612 A1* | 4/2022 | Lee | H01G 4/012 |

FOREIGN PATENT DOCUMENTS

| | | |
|---|---|---|
| JP | 2003-017356 A | 1/2003 |
| JP | 2004-096010 A | 3/2004 |
| JP | 2004-292186 A | 10/2004 |
| JP | 2006-041268 A | 2/2006 |
| JP | 2012-214334 A | 11/2012 |
| JP | 2016-195144 A | 11/2016 |
| JP | 2018-139253 A | 9/2018 |
| JP | 2019-029422 A | 2/2019 |

\* cited by examiner

CERAMIC ELECTRONIC DEVICE AND MANUFACTURING METHOD OF THE SAME

FIELD

A certain aspect of the present disclosure relates to a ceramic electronic device and a manufacturing method of the ceramic electronic device.

BACKGROUND

Ceramic electronic devices such as multilayer ceramic capacitors in which internal electrode layers and dielectric layers are alternately stacked are known. There are proposed a material in which a part of Ba of $BaTiO_3$ is replaced by Ca (for example, see Document 1) and a material in which a part of Ba of $BaTiO_3$ is replaced by Ca and a part of Ti of $BaTiO_3$ is replaced by Zr (for example, see Document 2), as the material of the dielectric layers.

There is proposed a method of applying dielectric paste next to an internal electrode layer in order to eliminate a level difference between the internal electrode layer and a dielectric layer next to the internal electrode layer, as a manufacturing process of the ceramic electronic devices (for example, see Document 3).

There are proposed methods of performing a glass-coating process of powder used for the dielectric paste and changing a composition of the dielectric paste in order to improve the resistance of the ceramic electronic devices to humidity (for example, see Document 4 and Document 5).

PRIOR ART

Patent Document

Document 1: Japanese Patent Application Publication No. 2004-292186
Document 2: Japanese Patent Application Publication No. 2012-214334
Document 3: Japanese Patent Application Publication No. S56-94719
Document 4: Japanese Patent Application Publication No. 2004-96010
Document 5: Japanese Patent Application Publication No. 2018-139253

Non-Patent Document

Non-patent Document 1: Fu et al., "Anomalous Phase Diagram of Ferroelectric (Ba,Ca)TiO₃ Single Crystals with Giant Electromechanical Response," Physical review letters, 100, 227601, 2008

SUMMARY OF THE INVENTION

The material (Document 1) in which a part of Ba of $BaTiO_3$ is replaced by Ca has higher reliability than $BaTiO_3$. However, the reactivity or grain growing characteristic of the material is high. Therefore, the material has electric distortion characteristic (Non-patent Document 1). Because of the electric distortion characteristic, the dielectric layers extend in a thickness direction when a voltage is applied to each internal electrode layer, and crack may occur.

The present invention has a purpose of providing a ceramic electronic device that is capable of suppressing crack in a dielectric layer and a manufacturing method of the ceramic electronic device.

According to a first aspect of the embodiments, there is provided a ceramic electronic device including: a multilayer structure having a substantially rectangular parallelepiped shape in which a plurality of dielectric layers and a plurality of internal electrode layers are alternately stacked, the plurality of internal electrode layers being alternately exposed to two end faces opposite to each other of the multilayer structure, the multilayer structure including a side margin section at each of side faces thereof that covers lateral side edges of the internal electrodes, wherein each of the plurality of dielectric layers and each of the side margin sections include, as a main component, ceramic grains of $(Ba_{1-x-y}Ca_xSr_y)(Ti_{1-z}Zr_z)O_3$ ($0<x\leq0.2$, $0\leq y\leq0.1$, $0\leq z\leq0.1$), where the value of x, y, and z may differ depending on layers and locations therein, and wherein D3<D1<D2 is satisfied, where: D1 is an average grain diameter of the ceramic grains in the plurality of dielectric layers in a section sandwiched by, and next to, two adjacent internal electrode layers, D2 is an average grain diameter of the ceramic grains in the side margin section in a region that is located at height positions different from the internal electrode layers, and D3 is an average grain diameter of the ceramic grains in the side margin section in a region that is located at the same height as the internal electrode layer.

The region in the side margin section that is located at the same height as the internal electrode layer in which D3 is defined may have a first section and a second section, the first section being closer to the plurality of internal electrode layers than the second section. D4'<D3' may be satisfied where D3' is an average grain diameter of the ceramic grains in the second section, and D4' may be an average grain diameter of the ceramic grains in the first section.

A width of the first section may be 20 μm or more and 80 μm or less.

D1 may be 100 nm or more and 400 nm or less. D2 may be 200 nm or more and 750 nm or less. And D3 may be 75 nm or more and 200 nm or less.

A thickness of each of the plurality of internal electrode layers may be 0.3 μm or more and 1.5 μm or less.

According to a second aspect of the embodiments, there is provided a manufacturing method of a ceramic electronic device including: forming an electrode pattern of metal conductive paste on each of a plurality of green sheets that include, as a main component, ceramic particles of $(Ba_{1-x-y}Ca_xSr_y)(Ti_{1-z}Zr_z)O_3$ ($0<x\leq0.2$, $0\leq y\leq0.1$, $0\leq z\leq0.1$); thereafter, on each of the plurality of green sheets on which the electrode pattern has been formed, forming a first pattern around the electrode pattern, the first pattern including, as a main component, ceramic particles of $(Ba_{1-x-y}Ca_xSr_y)(Ti_{1-z}Zr_z)O_3$ ($0<x\leq0.2$, $0\leq y\leq0.1$, $0\leq z\leq0.1$); stacking the plurality of green sheets on which the electrode pattern and the first pattern have been formed to form a multilayer structure such that the first patterns are alternately shifted in lateral positions; and firing the multilayer structure, wherein an average particle diameter of the ceramic particles in the first pattern is smaller than an average particle diameter of the ceramic particles in the plurality of green sheets.

The method may further includes: after the forming of the first pattern and before stacking the plurality of green sheets, forming a second pattern around the first pattern on the each of the plurality of green sheets, a main component of the second pattern being ceramic particles of $(Ba_{1-x-y}Ca_xSr_y)(Ti_{1-z}Zr_z)O_3$ ($0<x\leq0.2$, $0\leq y\leq0.1$, $0\leq z\leq0.1$). An average particle diameter of the ceramic particles in the second pattern may be larger than the average particle diameter of the ceramic particles in the first pattern and may be smaller than the average particle diameter of the ceramic particles in the plurality of green sheets.

DETAILED DESCRIPTION

Hereinafter, an exemplary embodiment will be described with reference to the accompanying drawings.

EXEMPLARY EMBODIMENTS

Figure 1:
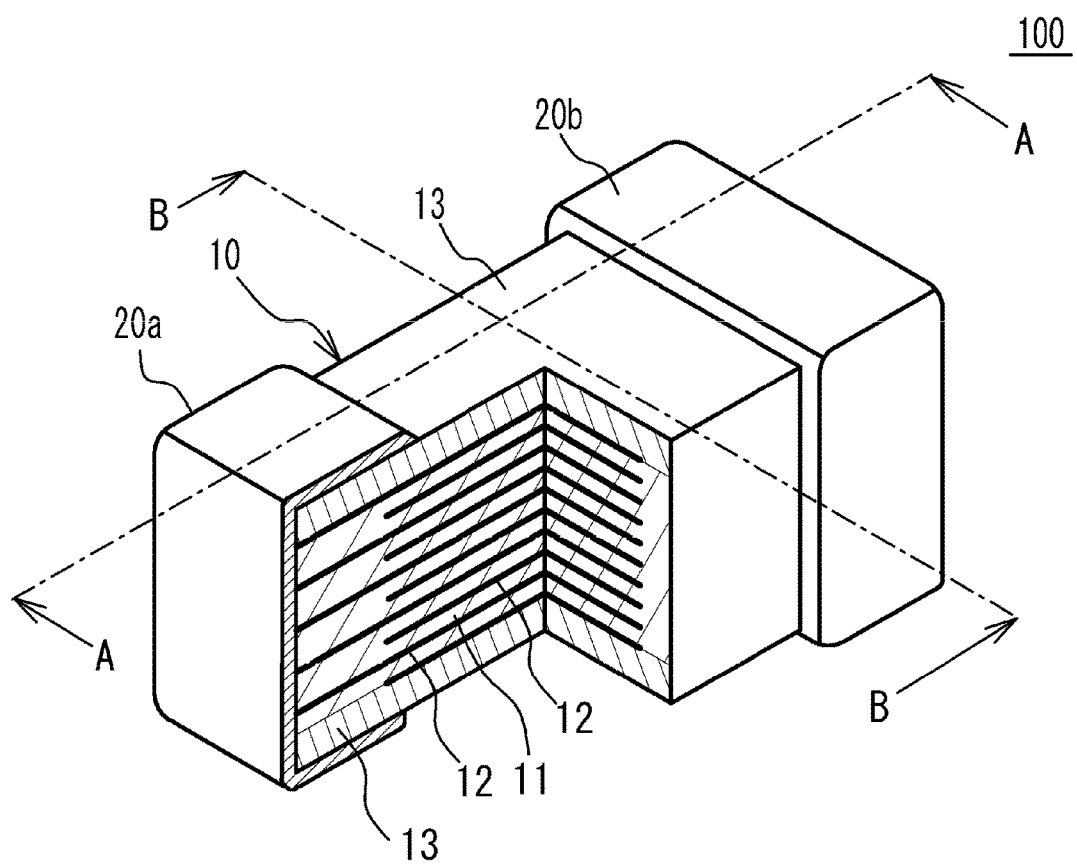
FIG. 1 is a partial cross-sectional perspective view of a multilayer ceramic capacitor.
Figure 2:
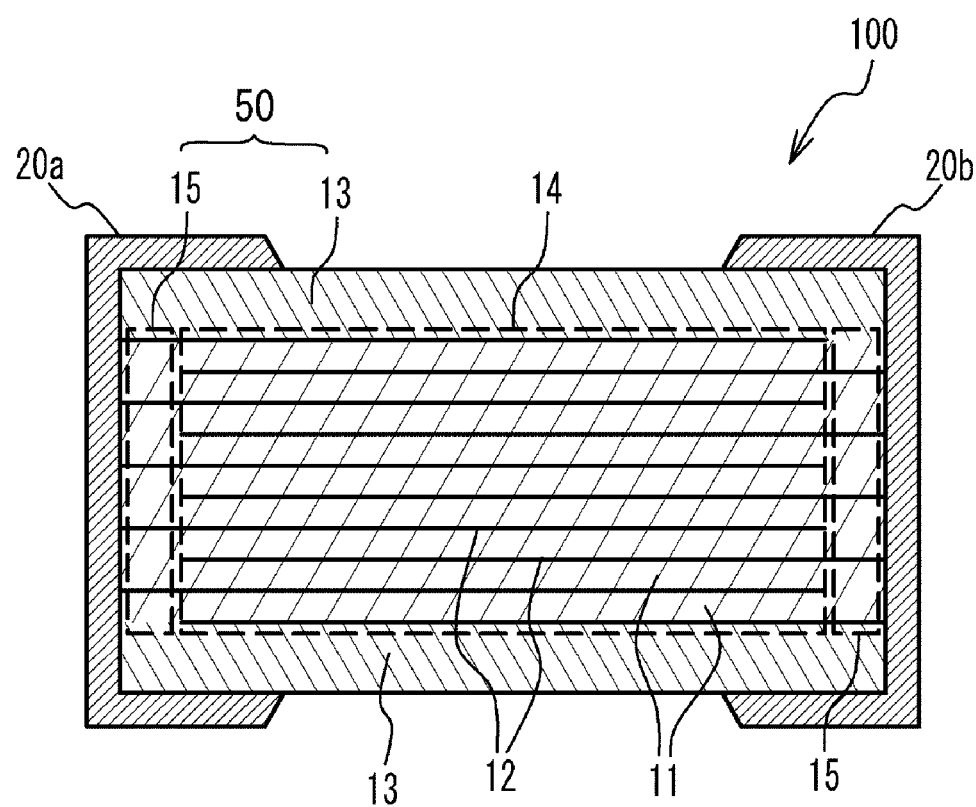
FIG. 2 is a cross-sectional view taken along line A-A in FIG. 1.
Figure 3:
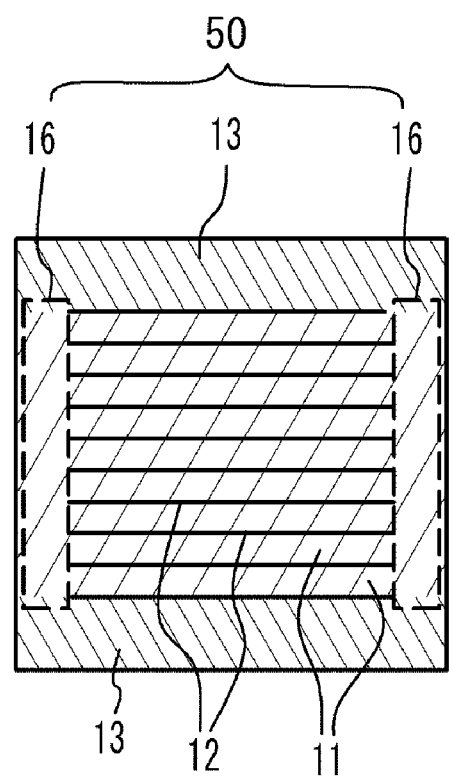
FIG. 3 is a cross-sectional view taken along line B-B in FIG. 1.

A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two end faces of the multilayer chip 10 opposite to each other. Among four faces other than the two end faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. The internal electrode layer 12 contains a base metal. End edges of the internal electrode layers 12 are alternately exposed to a first end face of the multilayer chip 10 and a second end face of the multilayer chip 10 that is different from the first end face. The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

The thickness of the dielectric layers 11 is not limited. For example, the thickness of each of the dielectric layers 11 is 0.5 μm or more and 10 μm or less. It is preferable that the thickness of each of the dielectric layers 11 is 0.5 μm or more and 3.0 μm or less. With this structure, it is possible to improve the withstand voltage in regions of high electric field strength in the dielectric layers 11.

For example, the thickness of each of the internal electrode layers 12 is 0.3 μm or more and 1.5 μm or less. It is preferable that the thickness of each of the internal electrode layers 12 is 0.5 μm or more and 1.0 μm or less. In these cases, it is possible to suppress increase in cost that would occur by enlarging the thickness of the internal electrode layers 12 and to suppress occurrence of discontinuity region in the internal electrode layers 12. Moreover, it is possible to stably form the internal electrode layers 12 by a firing process.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin section 15. The section where the internal electrode layers 12 connected to the external electrode 20b face each other with no internal electrode layer 12 connected to the external electrode 20a interposed therebetween is another end margin section 15. That is, the end margin section 15 is a section where the internal electrode layers 12 connected to one of the external electrodes face each other with no internal electrode layer 12 connected to the other of the external electrodes interposed therebetween. The end margin section 15 is a section where no capacity is generated.

As illustrated in FIG. 3, in the multilayer chip 10, a section from one of the two side faces of the multilayer chip 10 to lateral side edges of the internal electrode layers 12 is referred to as a side margin section 16. That is, each of the side margin sections 16 is a section that covers the lateral side edges, extending toward one of the side faces of the multilayer structure, of the stacked internal electrode layers 12. The side margin section 16 is a section where no capacity is generated.

The cover layers 13 and the side margin sections 16 protect the capacity section 14 by covering an outer circumference of the capacity section 14. The cover layers 13 and the side margin sections 16 are referred to as a protection portion.

A main component of the internal electrode layer 12 is a base metal such as nickel (Ni), copper (Cu), or the like. An alloy including platinum (Pt), palladium (Pd), silver (Ag), gold (Au), or tin (Sn) may be used as the main component of the internal electrode layer 12. MgO grains or MnO grains of 0.005 wt % or more and 5 wt % or less may be added to the internal electrode layer 12.

The dielectric layers 11 include ceramic grains of a main component which is expressed by $(Ba_{1-x-y}Ca_xSr_y)(Ti_{1-z}Zr_z)O_3$ ($0<x\le0.2$, $0\le y\le0.1$, $0\le z\le0.1$) (i.e., each of the dielectric layers 11 includes, as a main component, the ceramic grains expressed by this formula). The dielectric layers 11 may further include MgO, MnO, $SiO_2$, and one or more of rare earth elements such as $Ho_2O_3$, $Dy_2O_3$, $Y_2O_3$ or the like. These additives can improve insulation characteristic, dielectric characteristic, sintering characteristic or the like of the dielectric layers 11. These additives may form a solid solution with the ceramic grains of the main component.

Figure 4:
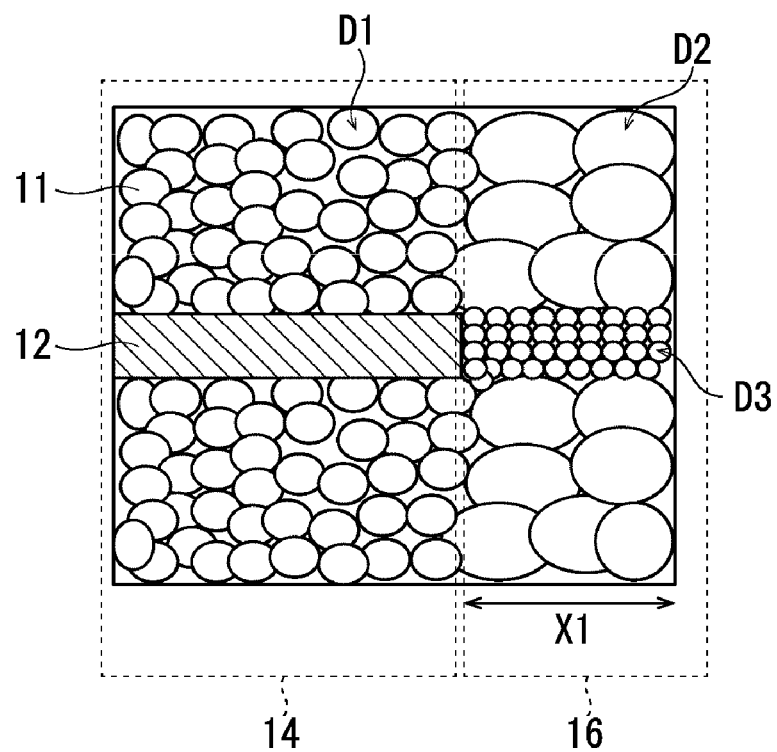
FIG. 4 illustrates an enlarged cross section of a multilayer ceramic capacitor of a first embodiment.

FIG. 4 illustrates an enlarged cross section of the multilayer ceramic capacitor 100. In FIG. 4, an average grain diameter of the ceramic grains of the main component of the dielectric layers 11 in the capacity section 14 is referred to as D1. An average grain diameter of the ceramic grains of the main component of a part, which is located at a different height position from the internal electrode layers 12, of the dielectric layers 11 in the side margin section 16 is referred to as D2. An average grain diameter of the ceramic grains of the main component of a part, which is located at the same height position as the internal electrode layers 12, of the dielectric layers 11 in the side margin section 16 is referred to as D3. The height position is a position in the stacking direction. The average grain diameter is an average size of 100 grains which are randomly extracted from a cross section of the corresponding subject area. Each size is calculated by measuring the longest line segment, in the stacking direction, of each of the 100 grains and calculating an average of such measured line segments along the stacking direction.

In the embodiment, D3<D1<D2 is satisfied. The strength of the dielectric layers 11 increases and the crack hardly occurs in the dielectric layers 11, as the average grain diameter of the ceramic grains of the main component decreases. In particular, the $(Ba_{1-x-y}Ca_xSr_y)(Ti_{1-z}Zr_z)O_3$ grains, which constitute the dielectric layers 11, have large electrical distortion characteristic. Therefore, when a voltage is applied to the internal electrode layers 12, a large tensile stress is applied to the dielectric layers 11 in the side margin section 16. This may cause the crack in the dielectric layers 11.

In this embodiment, among the dielectric layers 11 in the side margin section 16, the average grain diameter D3 of the dielectric layer 11 located at the same height position as the internal electrode layer 12 is smaller than the average grain diameters D1 and D2. It is therefore possible to increase the strength of the dielectric layers 11 near the interface between the dielectric layers 11 and the internal electrode layers 12 in the side margin section 16. It is therefore possible to suppress the crack in the dielectric layers 11.

Since the average grain diameter D1 of the dielectric layer 11 which contacts the internal electrode layer 12 in the stacking direction is smaller than the average grain diameter D2 of the dielectric layer 11. It is therefore possible to suppress the crack in the dielectric layer 11.

The grain diameters D1 to D3 are not limited. In the embodiment, it is preferable that the grain diameter D1 is 100 nm or more and 400 nm or less. It is more preferable that the grain diameter D1 is 130 nm or more and 250 nm or less. It is preferable that the grain diameter D2 is 200 nm or more and 750 nm or less. It is more preferable that the grain diameter D2 is 250 nm or more and 500 nm or less. It is preferable that the grain diameter D3 is 75 nm or more and 200 nm or less. It is more preferable that the grain diameter D3 is 75 nm or more and 120 nm or less.

The ratios of the grain diameters are not limited. It is preferable that the ratio D1/D2 is 0.3 or more and 0.8 or less. It is more preferable that the ratio D1/D2 is 0.43 or more and 0.63 or less. It is preferable that the ratio D2/D3 is 1.5 or more and 10.0 or less. It is more preferable that the ratio is 2.08 or more and 4.67 or less. It is preferable that the ratio D1/D3 is 1.2 or more and 5.0 or less. It is more preferable the ratio D1/D3 is 1.25 or more and 2.40 or less.

It is preferable that the width X1 of the side margin section 16 is 50 μm or more and 200 μm or less. It is more preferable that the width X1 is 80 μm or more and 160 μm or less. When the width X1 is within the ranges, it is possible to downsize the multilayer ceramic capacitor 100 and mechanically and chemically protect the section in which the dielectric layers 11 and the internal electrode layers 12 are stacked from an outer environment.

Figure 5:
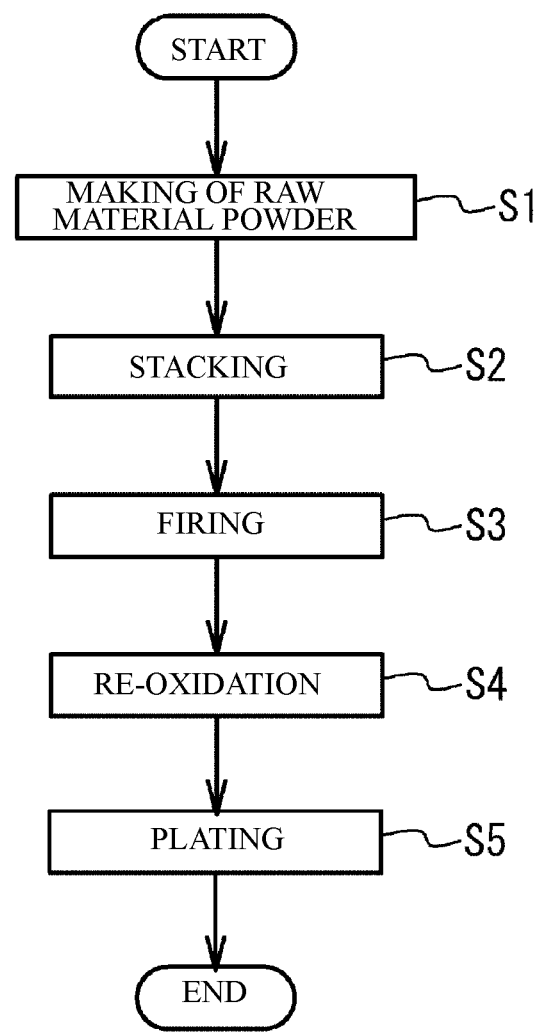
FIG. 5 is a flowchart of a manufacturing method of a multilayer ceramic capacitor of a first embodiment.

Next, the manufacturing method of the multilayer ceramic capacitor 100 will be described. FIG. 5 is a flowchart of the manufacturing method of the multilayer ceramic capacitor 100.

[Making of Raw Material Powder (S1)]

Starting materials for forming the dielectric layer 11 are prepared. For example, $CaCO_3$ powder, $TiO_2$ powder, $BaCO_3$ powder and $ZrO_2$ powder are prepared as the starting materials. Sr may be used instead of Ba or Ca. In this case, $SrCO_3$ powder may be added to the starting materials, as a source material of Sr. Next, the powder is weighed and is dispersed with use of ion-exchanged water and dispersion agent in a ball mill. Thus, the dielectric material is obtained.

Next, the dielectric material is dried and subjected to a dry grinding. After that, the dielectric material is calcined. As a result, $(Ba_{1-x-y}Ca_xSr_y)(Ti_{1-z}Zr_z)O_3$ particles are obtained as the perovskite-type ceramic particles of the main component for the dielectric layer 11. In the embodiment, $0<x\le0.2$, $0\le y\le0.1$, and $0\le z\le0.1$ are satisfied.

An average particle diameter of $(Ba_{1-x-y}Ca_xSr_y)(Ti_{1-z}Zr_z)O_3$ particles may be 80 nm to 350 nm. It is preferable that the average particle diameter is 120 nm to 250 nm.

Next, a reverse pattern material for forming the side margin section 16 and the end margin section 15 is prepared. The reverse pattern material includes ceramic particles of the main component for the end margin section 15 and the side margin section 16. By using the above-described method, $(Ba_{1-x-y}Ca_xSr_y)(Ti_{1-z}Zr_z)O_3$ particles are made as the ceramic particles of the main component. However, an average particle diameter of $(Ba_{1-x-y}Ca_xSr_y)(Ti_{1-z}Zr_z)O_3$ particles in the reverse pattern material is made smaller than an average particle diameter of $(Ba_{1-x-y}Ca_xSr_y)(Ti_{1-z}Zr_z)O_3$ particles in the dielectric material. This can be achieved by reducing a size of $TiO_2$ material and reducing the calcining temperature. In the embodiment, the average particle diameter of $(Ba_{1-x-y}Ca_xSr_y)(Ti_{1-z}Zr_z)O_3$ particles of the reverse pattern material is 50 nm or more 200 nm or less. It is preferable that the average particle diameter is 70 nm or more and 150 nm or less. The composition of the main component of the reverse pattern material may be the same as that of the dielectric material or may be different from that of the dielectric material. When the composition of the main component of the reverse pattern material is different from that of the dielectric material, the compositions of the main component of the reverse pattern material and the main component of the dielectric material are within $(Ba_{1-x-y}Ca_xSr_y)(Ti_{1-z}Zr_z)O_3$ ($0<x\leq0.2$, $0\leq y\leq0.1$, $0\leq z\leq0.1$). The composition of the additive of the reverse pattern material may be the same as that of the dielectric material or may be different from that of the dielectric material.

Next, a cover material for forming the cover layer 13 is prepared. The cover material includes ceramic particles of the main component for the cover layer 13. As the ceramic particles of the main component, $(Ba_{1-x-y}Ca_xSr_y)(Ti_{1-z}Zr_z)O_3$ particles are obtained by the above-mentioned method.

[Stacking Process (S2)]

Next, MgO, MnO, $SiO_2$ and $Y_2O_3$ are added to the ceramic particles of the main component made in the making process of raw material powder so as to make a ceramic powder. The ceramic powder is subjected to a ball mill process together with an organic solvent, a binder, a dispersing agent, and so on so as to obtain a slurry.

After that, the slurry is tape-casted on a base such as a PET (polyethylene terephthalate) film. Thus, a dielectric green sheet having a thickness of about 2.5 μm is obtained.

Next, a metal conductive paste, which includes an organic binder, for the internal electrode layer is printed on the surface of the dielectric green sheet by screen printing or gravure printing. In addition to nickel, ceramic particles are added as a co-material to the metal conductive paste. The main component of the ceramic particles is not particularly limited, but is preferably the same as the main component ceramic of the dielectric layer 11. Moreover, at least one of ceramic particles of MgO or ceramic particles of MnO are added to the metal conductive paste for the internal electrode layer. Instead of these ceramic particles, a co-material in which the amounts of MgO or the amount of MnO is larger than that of the main component of the dielectric layer 11 may be added to the metal conductive paste.

Figure 6A:
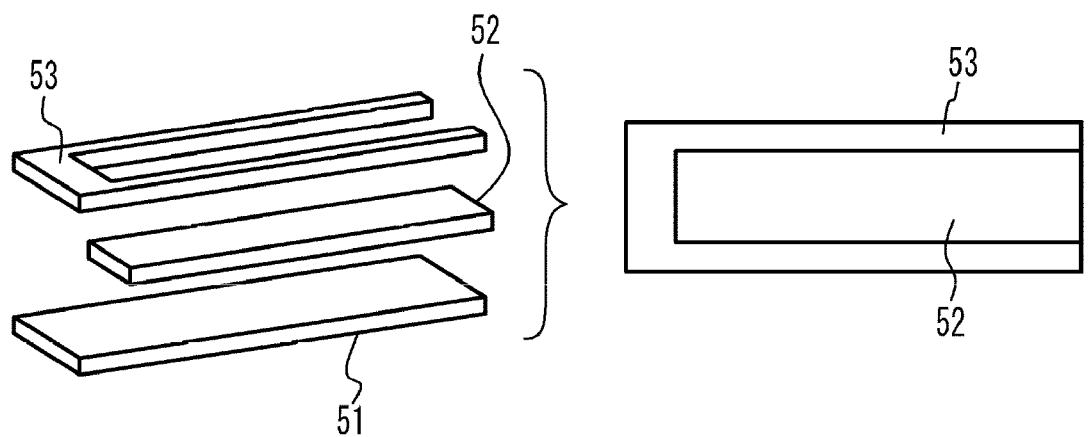
FIG. 6A and FIG. 6B illustrate a stacking process of a first embodiment.

For example, an electrode pattern 52 to be the internal electrode layer is formed on surface of dielectric green sheet 51 by printing the above-described metal conductive paste for forming the internal electrode with use of screen printing or gravure printing, as illustrated in FIG. 6A. The metal conductive paste for forming the internal electrode contains an organic binder, as described above.

Next, a binder such as ethyl cellulose and an organic solvent such as terpineol are added to the reverse pattern material made in the making process of the raw material powder, and the resulting reverse pattern material is kneaded by a roll mill so as to obtain a reverse pattern paste for the reverse pattern layer. As illustrated in FIG. 6A, the reverse pattern paste is printed on the dielectric green sheet 51 where the electrode pattern 52 is not printed so that a first pattern 53 is arranged to eliminate or mitigate a level difference formed by the electrode pattern 52.

Figure 6B:
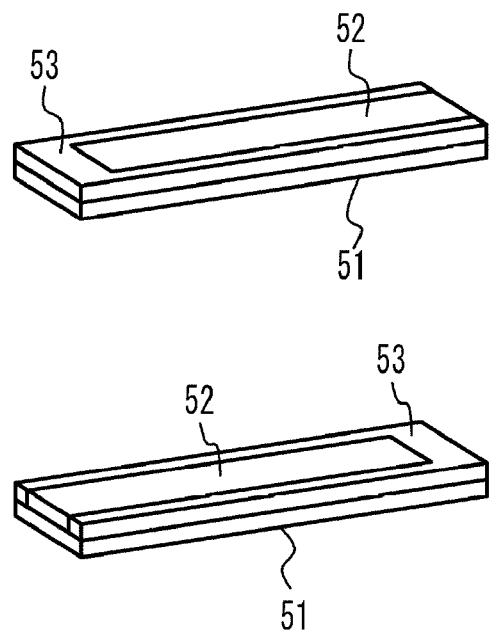

After that, as illustrated in FIG. 6B, a plurality of the dielectric green sheets 51 on which the electrode pattern 52 and the first pattern 53 are printed are stacked so that the internal electrode layers 12 and the dielectric layers 11 will be alternated with each other and the end edges of the internal electrode layers 12 will be alternately exposed to the respective end faces in the length direction of the dielectric layer so as to be alternately led out to a pair of external electrodes of different polarities. The number of the stacked dielectric green sheets 51 is 100 to 500, for example.

Figure 7:
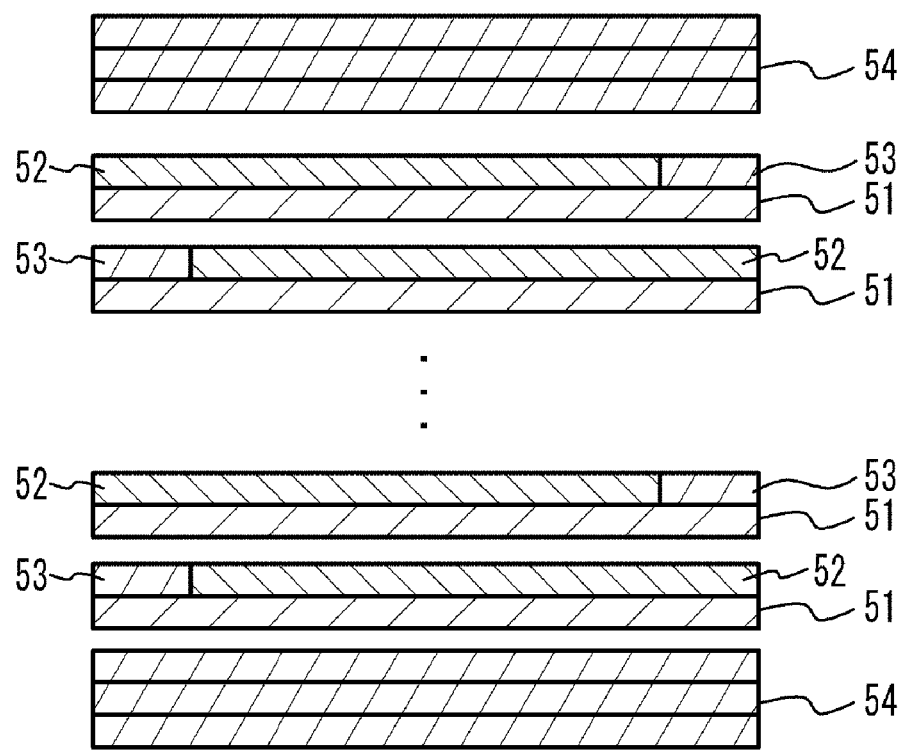
FIG. 7 illustrates a stacking process of a first embodiment.

Next, a binder such as polyvinyl butyral (PVB) resin, an organic solvent such as ethanol or toluene, and a plasticizer are added to the cover material made in the above-described making process of the raw material powder and are wet-blended. With use of the resulting slurry, a strip-shaped cover sheet 54 is painted on a base material by, for example, a die coater method or a doctor blade method, and then dried. The cover sheet has a thickness of 10 μm or less. As illustrated in FIG. 7, a predetermined number of the cover sheets 54 are thermally pressed on the upper face and the lower face of the stacked dielectric green sheets 51 in the stacking direction. The predetermined number is, for example, 2 to 10. Thereafter, the resulting multilayer structure is cut into a predetermined chip size (for example, 1.0 mm×0.5 mm). Then, a metal conductive paste to be the external electrodes 20a and 20b is applied to each of the end faces of the resulting multilayer structure by a dipping method or the like and is dried. As a result, a ceramic multilayer structure is obtained. Here, the predetermined number of the cover sheets 54 may be thermally pressed onto each other in advance, and the resulting cover sheets 54 may be stacked on the upper face and the lower face of the stacked dielectric greens sheets 51.

In the method of FIG. 6A to FIG. 7, a section in which a portion of the dielectric green sheet 51 that projects laterally from an area where the electrode pattern 52 is formed and the first pattern 53 are stacked together correspond to the side margin section arranged at either side face of the multilayer structure.

[Firing Process (S3)]

Thereafter, the binder is removed from the resulting ceramic multilayer structure in $N_2$ atmosphere, for example. After that, Ni paste to be the base layer of the external electrodes 20a and 20b is painted by a dipping method, for example. The resulting ceramic multilayer structure is fired in a reducing atmosphere with an oxygen partial pressure of $10^{-5}$ to $10^{-8}$ atm in a temperature of 1220° C. or less for 10 minutes to 2 hours, for example, to complete the manufacture of the multilayer ceramic capacitor 100.

The component, such as MgO or MnO, which is added to the internal electrodes in advance diffuses into the dielectric layers 11 in the firing process. Therefore, the component suppresses the grain growth in the dielectric layers 11. Accordingly, the average grain diameter D1 of the dielectric layer 11, which is next to the internal electrode layer 12 in the stacking direction and includes a large amount of this component, is smaller than the average grain diameter D2.

On the other hand, the average grain diameter D3 is made smaller than the average grain diameter D1 by making the average particle diameter of $(Ba_{1-x-y}Ca_xSr_y)(Ti_{1-z}Zr_z)O_3$ particles in the reverse pattern smaller than the average particle diameter of $(Ba_{1-x-y}Ca_xSr_y)(Ti_{1-z}Zr_z)O_3$ particles in the dielectric material and/or by making the amount of MgO or MnO in the reverse pattern larger than that in the dielectric layer 11. In the embodiment, this results in D3<D1<D2 as described above with reference to FIG. 4.

[Re-Oxidation Process]

A re-oxidation process may be performed in a temperature range of 600 degrees C. to 1000 degrees C. in $N_2$ gas atmosphere.

[Plating Process]

After that, metal layers such as Cu, Ni, Sn or the like may be formed on the base layers of the external electrodes 20a and 20b by plating.

Second Embodiment

Figure 8:
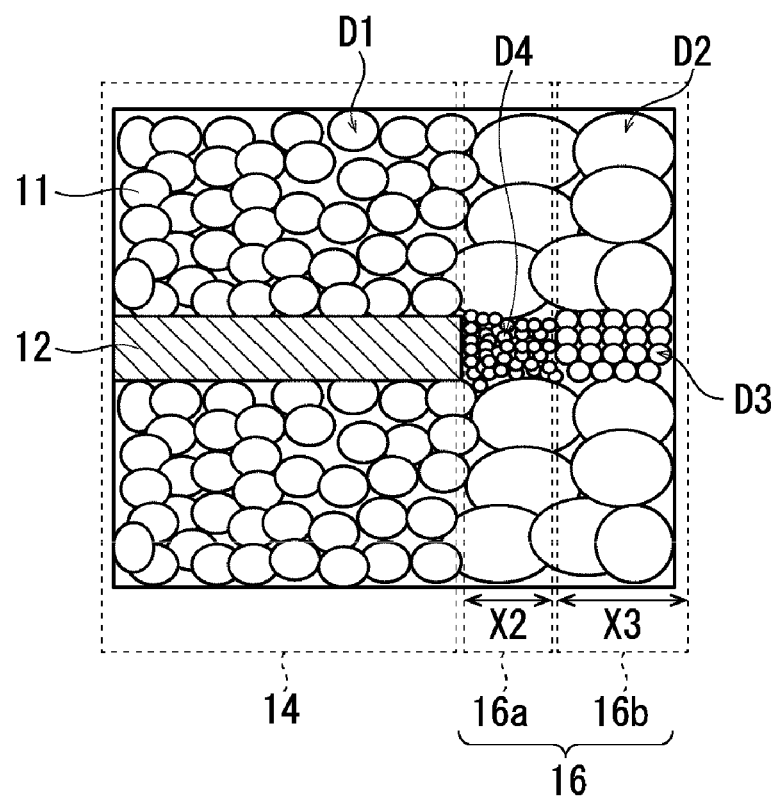
FIG. 8 illustrates an enlarged cross section of a multilayer ceramic capacitor of a second embodiment.

FIG. 8 illustrates an enlarged cross section of the multilayer ceramic capacitor 100 according to a second embodiment. As illustrated in FIG. 8, in the second embodiment, the side margin section 16 includes a first section 16a and a second section 16b. The first section 16a is closer to the internal electrode layer 12 than the second section 16b. In this embodiment, D4<D3 is satisfied, where D3 is an average grain diameter of ceramic grains of the main component of the dielectric layers 11 in the second section 16b, and D4 is an average grain diameter of ceramic grains of the main component of the dielectric layers 11 in the first section 16a. In more detail, a portion of the side margin section that is located at the same height as the internal electrode layer 12 has two sections—i.e., the first section 16a at the inner side and the second section 16b at the outer side, and the first section 16a has finer ceramic grains than the second section 16b. The average grain diameter of the ceramic grains averaged over the entire such side margin section (i.e., the combined section of the first and second sections 16a and 16b), which is referred to as D3 in the first embodiment above, still satisfies the D3<D1<D2 formula described above. When the average grain diameter for the entire such side margin section is denoted by D3 as in the first embodiment, the above-mentioned average grain diameter D4 in the first section 16a is re-labelled as D4' and the above-mentioned average grain diameter D3 in the second section 16b is re-labelled as D3' to avoid confusion.

With this structure, the strength of the dielectric layers 11 in the first section 16a closer to the internal electrode layer 12 increases. It is therefore possible to effectively suppress the crack in the dielectric layers 11 in the first section 16a.

The grain diameters D1 to D4 are not limited. In the embodiment, it is preferable that the grain diameter D1 is 100 nm or more and 400 nm or less. It is more preferable that the grain diameter D1 is 130 nm or more and 250 nm or less. It is preferable that the grain diameter D2 is 200 nm or more and 750 nm or less. It is more preferable that the grain diameter D2 is 250 nm or more and 500 nm or less. It is preferable that the grain diameter D3 is 75 nm or more and 200 nm or less. It is more preferable that the grain diameter D3 is 75 nm or more and 120 nm or less. It is preferable that the grain diameter D4 is 75 nm or more and 200 nm or less. It is more preferable that the grain diameter D4 is 75 nm or more and 90 nm or less.

The ratios of the grain diameters are not limited. It is preferable that the ratio D1/D2 is 0.3 or more and 0.8 or less. It is more preferable that the ratio D1/D2 is 0.43 or more and 0.63 or less. It is preferable that the ratio D2/D3 is 1.5 or more and 10.0 or less. It is more preferable that the ratio D2/D3 is 2.08 or more and 4.67 or less. It is preferable that the ratio D3/D4 is 0.7 or more and 2.6 or less. It is more preferable that the ratio D3/D4 is 1.2 or more and 1.6 or less. It is preferable that the ratio D1/D3 is 1.2 or more and 5.0 or less. It is more preferable the ratio D1/D3 is 1.25 or more and 2.4 or less.

It is preferable that a width X2 of the first section 16a is 20 μm or more and 100 μm or less. It is more preferable that the width X2 is 50 μm or more and 80 μm or less. When the width X2 is within the range, it is possible to effectively protect the capacity section of the multilayer ceramic capacitor 100.

Figure 9A:
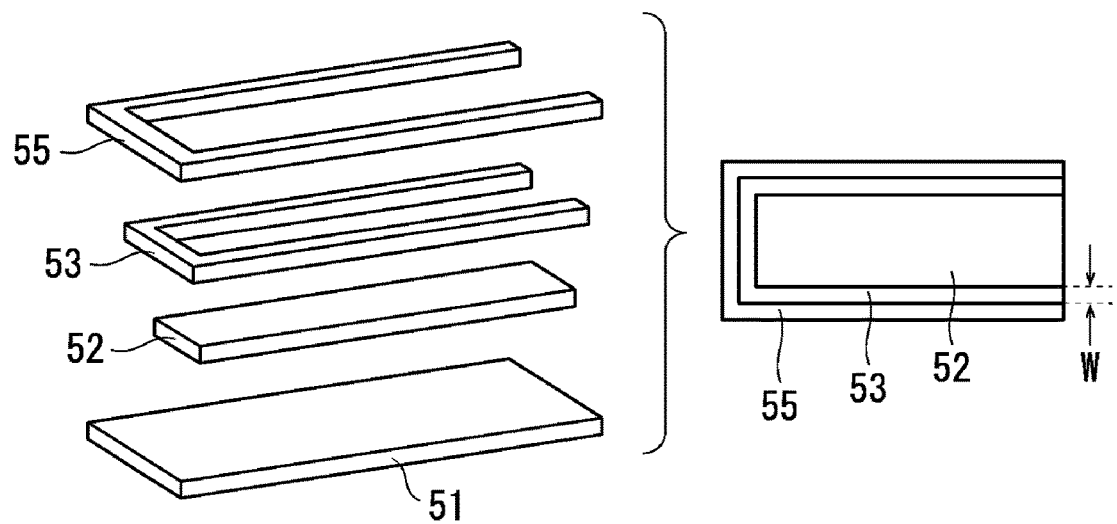
FIG. 9A and FIG. 9B illustrate a stacking process of a second embodiment.
Figure 9B:
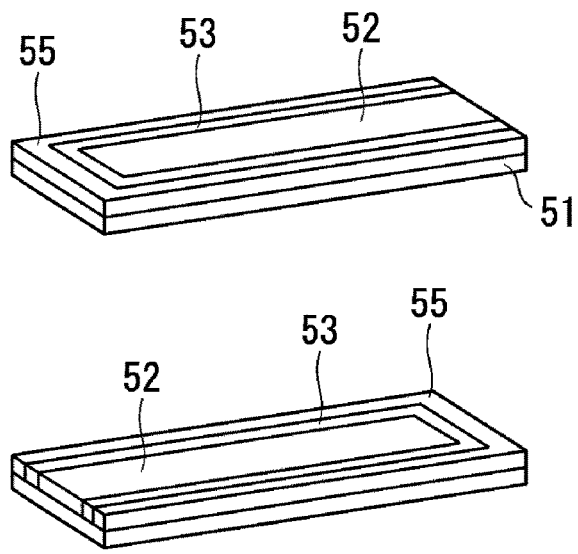

FIG. 9A and FIG. 9B illustrate a stacking process of the second embodiment. As illustrated in FIG. 9A, the electrode pattern 52 and the first pattern 53 are arranged on the surface of the dielectric green sheet 51. A second pattern 55 is arranged on the surface of the dielectric green sheet 51 around the first pattern 53. The first pattern 53 corresponds to the first section 16a. The second pattern 55 corresponds to the second section 16b.

Like the first pattern 53, the second pattern 55 is formed from a reverse pattern paste. However, the average particle diameter of $(Ba_{1-x-y}Ca_xSr_y)(Ti_{1-z}Zr_z)O_3$ particles in the first pattern 53 is made smaller than the average particle diameter of $(Ba_{1-x-y}Ca_xSr_y)(Ti_{1-z}Zr_z)O_3$ particles in the second pattern 55, and is 50 nm or more and 100 nm or less. The amount of MgO or MnO in the first pattern 53 is also made larger than that in the second pattern 55. It is therefore possible to satisfy D4<D3. The width W of the second pattern 55 in the side margin section 16 may be 20 μm or more and 80 μm or less.

After that, as illustrated in FIG. 9B, a plurality of the dielectric green sheets 51 on which the electrode pattern 52, the first pattern 53 and the second pattern 55 are printed are stacked so that the internal electrode layers 12 and the dielectric layers 11 are alternated with each other and the end edges of the internal electrode layers 12 are alternately exposed to the respective end faces in the length direction of the dielectric layer so as to be alternately led out to a pair of external electrodes of different polarities.

After that, the firing process, the re-oxidation process and the plating process are performed as in the case of the first embodiment. As a result, the multilayer ceramic capacitor of the second embodiment is fabricated.

EXAMPLES

Next, a description will be given of working examples and comparative examples. Table 1 shows conditions of the working examples and the comparative examples.

TABLE 1

| | D1 (nn) | D2 (nm) | D3 (nm) | D4 (nm) | W (μm) | AVERAGE RESISTANCE VOLTAGE (V) |
|---|---|---|---|---|---|---|
| EXAMPLE 1 | 180 | 350 | 110 | — | — | 240 |
| EXAMPLE 2 | 200 | 400 | 95 | — | — | 255 |
| EXAMPLE 3 | 250 | 400 | 100 | — | — | 231 |
| EXAMPLE 4 | 150 | 250 | 120 | — | — | 260 |
| EXAMPLE 5 | 130 | 300 | 100 | — | — | 242 |
| EXAMPLE 6 | 180 | 350 | 75 | 110 | 50 | 242 |
| EXAMPLE 7 | 180 | 350 | 110 | 75 | 20 | 250 |
| EXAMPLE 8 | 180 | 350 | 110 | 75 | 50 | 250 |
| EXAMPLE 9 | 180 | 350 | 110 | 75 | 80 | 283 |
| COMPARATIVE EXAMPLE 1 | 180 | 350 | 350 | — | — | 190 |
| COMPARATIVE EXAMPLE 2 | 200 | 500 | 300 | — | — | 175 |

Example 1

In Example 1, the multilayer ceramic capacitor 100 is made in accordance with the first embodiment. That is, $CaCO_3$ powder, $TiO_2$ powder, and $BaCO_3$ powder were weighed and were dispersed with use of ion-exchanged water and dispersion agent in a ball mill so as to produce the dielectric material for the dielectric green sheet 51. After drying the dielectric material, the dielectric material was subjected to a dry crushing. The resulting dielectric material was calcined at 1100 degrees C. to obtain $(Ba_{0.94}Ca_{0.06})TiO_3$ particles in which an average particle diameter was 150 nm. MgO, MnO, $SiO_2$ and $Y_2O_3$ were added to the resulting dielectric material to form the dielectric green sheet 51 having a thickness of 2.5 μm.

The electrode pattern 52 for forming the internal electrode layer 12 was provided on the dielectric green sheet 51 by printing nickel paste including MgO and MnO.

The dielectric main component material was calcined at 1050 degrees C. Thus, $(Ba_{0.96}Ca_{0.04})TiO_3$ particles in which the average particle diameter was 100 nm was formed, as the ceramic particles of the main component of the first pattern 53. MgO, MnO, $SiO_2$ and $Y_2O_3$ were added to the perovskite particles to thereby form the first pattern 53.

The number of the stacked dielectric green sheets 51 on which the electrode pattern 52 and the first pattern 53 were provided was 300. After that, the cover sheet 54 was thermally pressed on an upper face and a lower face of the multilayer structure. The resulting multilayer structure was stamped into a predetermined size. After removing the binder, the resulting multilayer structure was fired. The average grain diameter D1 after the firing was 180 nm. The average grain diameter D2 after the firing was 350 nm. The average grain diameter D3 after the firing was 110 nm. The average grain diameters D1 to D3 were calculated by capturing a plurality of SEM (Scanning Electron Microscope) images of a ground face of the dielectric layers 11 after performing a thermal etching process thereon and by calculating an average value of diameters of 500 grains from the images. The thickness of the dielectric layer 11 was 1.8 μm. The width of the first pattern 53 was 100 μm. The width of the side margin was 100 μm. The multilayer ceramic capacitor 100 had a length of 1.0 mm, a width of 0.5 mm, and a height of 0.5 mm.

Example 2

Like Example 1, the multilayer ceramic capacitor 100 of Example 2 was made in accordance with the first embodiment. The particle diameter of the ceramic particles of the main component of the dielectric green sheet 51 and the particle diameter of the ceramic particles of the main component of the first pattern 53 were adjusted so that the average grain diameter D1 after the firing process was 200 nm, the average grain diameter D2 after the firing process was 400 nm and the average grain diameter D3 after the firing process was 95 nm. The width of the first pattern 53 was 100 μm. The width of the side margin was 100 μm. The multilayer ceramic capacitor 100 had a length of 1.0 mm, a width of 0.5 mm, and a height of 0.5 mm.

Example 3

Like Examples 1 and 2, the multilayer ceramic capacitor 100 of Example 3 was made in accordance with the first embodiment. The particle diameter of the ceramic particles of the main component of the dielectric green sheet 51 and the particle diameter of the ceramic particles of the main component of the first pattern 53 were adjusted so that the average grain diameter D1 after the firing process was 250 nm, the average grain diameter D2 after the firing process was 400 nm and the average grain diameter D3 after the firing process was 100 nm. The width of the first pattern 53 was 100 μm. The width of the side margin was 100 μm. The multilayer ceramic capacitor 100 had a length of 1.0 mm, a width of 0.5 mm, and a height of 0.5 mm.

Example 4

Like Examples 1-3, the multilayer ceramic capacitor 100 of Example 4 was made in accordance with the first embodiment. The particle diameter of the ceramic particles of the main component of the dielectric green sheet 51 and the particle diameter of the ceramic particles of the main component of the first pattern 53 were adjusted so that the average grain diameter D1 after the firing process was 150 nm, the average grain diameter D2 after the firing process was 250 nm and the average grain diameter D3 after the firing process was 120 nm. The width of the first pattern 53 was 100 μm. The width of the side margin was 100 μm. The multilayer ceramic capacitor 100 had a length of 1.0 mm, a width of 0.5 mm, and a height of 0.5 mm.

Example 5

Like Examples 1-4, the multilayer ceramic capacitor 100 of Example 5 was made in accordance with the first embodiment. The particle diameter of the ceramic particles of the main component of the dielectric green sheet 51 and the particle diameter of the ceramic particles of the main component of the first pattern 53 were adjusted so that the average grain diameter D1 after the firing process was 130 nm, the average grain diameter D2 after the firing process was 300 nm and the average grain diameter D3 after the firing process was 100 nm. The width of the first pattern 53 was 100 μm. The width of the side margin was 100 μm. The multilayer ceramic capacitor 100 had a length of 1.0 mm, a width of 0.5 mm, and a height of 0.5 mm.

Example 6

In an example 6, the multilayer ceramic capacitor 100 is made in accordance with the second embodiment. As in Example 1, the electrode pattern 52 and the first pattern 53 were printed on the dielectric green sheet 51. In addition, like the first pattern 53, the second pattern 55 that had, as its main component, ceramic particles of $(Ba_{0.94}Ca_{0.06})TiO_3$ and had MgO, MnO, $SiO_2$ and $Y_2O_3$ added to the ceramic particles was printed on the dielectric green sheet 51 around the first pattern 53. The average particle diameter of $(Ba_{0.94}Ca_{0.06})TiO_3$ particles in the second pattern 55 was 100 nm. The average particle diameter of $(Ba_{0.94}Ca_{0.06})TiO_3$ particles in the first pattern 53 was 70 nm.

The number of the stacked dielectric green sheets 51 on which the electrode pattern 52 and the first pattern 53 were provided was 300. After that, the cover sheet 54 was thermally pressed on an upper face and a lower face of the multilayer structure. The resulting multilayer structure was stamped into a predetermined size. After removing the binder, the resulting multilayer structure was fired. The average grain diameter D1 after the firing was 180 nm. The average grain diameter D2 after the firing was 350 nm. The average grain diameter D3 after the firing was 75 nm. The average grain diameter D4 after the firing was 110 nm. The average grain diameters D1 to D4 were calculated by capturing a plurality of SEM (Scanning Electron Microscope) images of a ground face of the dielectric layers 11 after performing a thermal etching process thereon and by calculating an average value of diameters of 100 grains from the images. The width W of the second pattern 55 was 50 μm. The width of the first pattern 53 was 50 μm. The width of the side margin was 100 μm. The width ratio of the second pattern 55 in the side margin was 0.5. The multilayer ceramic capacitor 100 had a length of 1.0 mm, a width of 0.5 mm, and a height of 0.5 mm.

Example 7

Like Example 6, the multilayer ceramic capacitor 100 of Example 7 was made in accordance with the second embodiment. The particle diameter of the ceramic particles of the main component of the dielectric green sheet 51 and the particle diameter of the ceramic particles of the main component of the first pattern 53 were adjusted so that the average grain diameter D1 after the firing process was 180 nm, the average grain diameter D2 after the firing process was 350 nm, the average grain diameter D3 after the firing process was 110 nm and the average grain diameter D4 after the firing process as 75 nm. The width W of the second pattern 55 was 20 μm. The width of the first pattern 53 was 80 μm. The width of the side margin was 100 μm. The width ratio of the second pattern 55 in the side margin was 0.8. The multilayer ceramic capacitor 100 had a length of 1.0 mm, a width of 0.5 mm, and a height of 0.5 mm.

Example 8

Like Examples 6-7, the multilayer ceramic capacitor 100 of Example 8 was made in accordance with the second embodiment. The particle diameter of the ceramic particles of the main component of the dielectric green sheet 51 and the particle diameter of the ceramic particles of the main component of the first pattern 53 were adjusted so that the width W of the second pattern 55 was 50 μm. Other conditions were the same as those of the example 7. The width of the first pattern 53 was 50 μm. The width of the side margin was 100 μm. The width ratio of the second pattern 55 in the side margin was 0.5. The multilayer ceramic capacitor 100 had a length of 1.0 mm, a width of 0.5 mm, and a height of 0.5 mm.

Example 9

Like Examples 6-8, the multilayer ceramic capacitor 100 of Example 9 was made in accordance with the second embodiment. The particle diameter of the ceramic particles of the main component of the dielectric green sheet 51 and the particle diameter of the ceramic particles of the main component of the first pattern 53 were adjusted so that the width W of the second pattern 55 was 80 μm. Other conditions were the same as those of the example 7. The width of the first pattern 53 was 20 μm. The width of the side margin was 100 μm. The width ratio of the second pattern 55 in the side margin was 0.2. The multilayer ceramic capacitor 100 had a length of 1.0 mm, a width of 0.5 mm, and a height of 0.5 mm.

Comparative Example 1

The multilayer ceramic capacitor of Comparative Example 1 was made by stacking the dielectric green sheet 51, the electrode pattern 52 and the first pattern 53 in a manner similar to the manner in which Examples 1~4 were made. However, the average grain diameter D1 after the firing process was 180 nm, the average grain diameter D2 after the firing process was 350 nm, and the average grain diameter D3 after the firing process was 350 nm. Thus, D1<D3 and D2=D3 were satisfied. Other conditions were the same as those of Example 1.

Comparative Example 2

The multilayer ceramic capacitor of Comparative Example 2 was made by stacking the dielectric green sheet 51, the electrode pattern 52 and the first pattern 53 in a manner similar to Comparative Example 1. However, the average grain diameter D1 after the firing process was 200 nm. The average grain diameter D2 after the firing process was 500 nm. The average grain diameter D3 after the firing process was 300 nm. Thus, D1<D3 was satisfied.

A breakdown test was performed with respect to each of Examples 1 to 9 and Comparative Examples 1 and 2. In the breakdown test, voltages were applied to the multilayer ceramic capacitors at a speed of 20V/s. A voltage at which the multilayer ceramic capacitor was broken down was determined to be a withstand voltage (V). For each of Examples 1-9 and Comparative Examples 1-2, the withstand voltage was measured for 20 samples, and an average was taken. When the averaged withstand voltage (V) was larger than 230 V, it was evaluated as good. When the averaged withstand voltage (V) was 230 V or less, it was evaluated as bad.

As shown in Table 1, the examples 1 to 9 satisfying D3<D1<D2 were all evaluated as good because the average withstand voltage (V) was larger than 230 V. This is because the crack in the dielectric layers 11 was suppressed when the voltage was applied to the internal electrode layers 12. On the other hand, the comparative examples 1 and 2 were evaluated as bad because the average withstand voltage (V) was 230 V or less. From these results, it was confirmed that the crack in the dielectric layers 11 was suppressed when D3<D1<D2 was satisfied.

By comparing Examples 7 to 9 in which the average grain diameters D1 to D4 were the same as each other, and the values of W are different, it was found that the average withstand voltage (V) became larger when the width W was 50 μm or more.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer structure having a substantially rectangular parallelepiped shape in which a plurality of dielectric layers and a plurality of internal electrode layers are alternately stacked, the plurality of internal electrode layers being alternately exposed to two end faces opposite to each other of the multilayer structure, the multilayer structure including a side margin section at each of side faces thereof that covers lateral side edges of the internal electrodes,
wherein each of the plurality of dielectric layers and each of the side margin sections include, as a main component, ceramic grains of $(Ba_{1-x-y}Ca_xSr_y)(Ti_{1-z}Zr_z)O_3$ ($0<x\leq0.2$, $0\leq y\leq0.1$, $0\leq z\leq0.1$), where the value of x, y, and z may differ depending on layers and locations therein, and
wherein D3<D1<D2 is satisfied, where:
D1 is an average grain diameter of the ceramic grains in the plurality of dielectric layers in a section sandwiched by, and next to, two adjacent internal electrode layers,
D2 is an average grain diameter of the ceramic grains in the side margin section in a region that is located at height positions different from the internal electrode layers, and
D3 is an average grain diameter of the ceramic grains in the side margin section in a region that is located at the same height as the internal electrode layer.

2. The ceramic electronic device as claimed in claim 1, wherein the region in the side margin section that is located at the same height as the internal electrode layer in which D3 is defined has a first section and a second section, the first section being closer to the plurality of internal electrode layers than the second section, and wherein D4'<D3' is satisfied where D3' is an average grain diameter of the ceramic grains in the second section, and D4' is an average grain diameter of the ceramic grains in the first section.

3. The ceramic electronic device as claimed in claim 2, wherein a width of the first section is 20 μm or more and 80 μm or less.

4. The ceramic electronic device as claimed in claim 1, wherein D1 is 100 nm or more and 400 nm or less,
wherein D2 is 200 nm or more and 750 nm or less, and
wherein D3 is 75 nm or more and 200 nm or less.

5. The ceramic electronic device as claimed in claim 1, wherein a thickness of each of the plurality of internal electrode layers is 0.3 μm or more and 1.5 μm or less.

6. A manufacturing method of a ceramic electronic device comprising:

forming an electrode pattern of metal conductive paste on each of a plurality of green sheets that include, as a main component, ceramic particles of $(Ba_{1-x-y}Ca_xSr_y)(Ti_{1-z}Zr_z)O_3$ ($0<x\leq0.2$, $0\leq y\leq0.1$, $0\leq z\leq0.1$);

thereafter, on each of the plurality of green sheets on which the electrode pattern has been formed, forming a first pattern around the electrode pattern, the first pattern including, as a main component, ceramic particles of $(Ba_{1-x-y}Ca_xSr_y)(Ti_{1-z}Zr_z)O_3$ ($0<x\leq0.2$, $0\leq y\leq0.1$, $0\leq z\leq0.1$);

stacking the plurality of green sheets on which the electrode pattern and the first pattern have been formed to form a multilayer structure such that the first patterns are alternately shifted in lateral positions; and firing the multilayer structure, thereby converting the respective ceramic particles to corresponding ceramic grains, respectively, wherein an average grain diameter D3 of the ceramic grains in the first pattern after the firing is smaller than an average grain diameter D1 of the ceramic grains in the plurality of green sheets after the firing in a section sandwiched by, and next to, two adjacent electrode patterns, and wherein an average grain diameter D2 of the ceramic grains in the plurality of green sheets in a section corresponding to the first pattern in lateral position is greater than the average grain diameter D1, thereby satisfying D3<D1<D2.

7. The method as claimed in claim 6, further comprising:

after the forming of the first pattern and before stacking the plurality of green sheets, forming a second pattern around the first pattern on the each of the plurality of green sheets, a main component of the second pattern being ceramic particles of $(Ba_{1-x-y}Ca_xSr_y)(Ti_{1-z}Zr_z)O_3$ ($0<x\leq0.2$, $0\leq y\leq0.1$, $0\leq z\leq0.1$), wherein an average particle diameter of the ceramic particles in the second pattern is larger than the average particle diameter of the ceramic particles in the first pattern and is smaller than the average particle diameter of the ceramic particles in the plurality of green sheets.

* * * * *